US012686091B2

(12) United States Patent
Iida et al.

(10) Patent No.: US 12,686,091 B2
(45) Date of Patent: Jul. 21, 2026

(54) DUST COLLECTION SYSTEM FOR POWER TOOL

(71) Applicant: MAKITA CORPORATION, Anjo (JP)

(72) Inventors: Hitoshi Iida, Anjo (JP); Masanori Furusawa, Anjo (JP); Kei Watanabe, Anjo (JP)

(73) Assignee: MAKITA CORPORATION, Anjo (JP)

( * ) Notice: Subject to any disclaimer, the term of this patent is extended or adjusted under 35 U.S.C. 154(b) by 51 days.

(21) Appl. No.: 18/623,421

(22) Filed: Apr. 1, 2024

(65) Prior Publication Data

US 2024/0416470 A1 Dec. 19, 2024

(30) Foreign Application Priority Data

Jun. 13, 2023 (JP) ................................ 2023-097207

(51) Int. Cl.
| | |
|---|---|
| *B23Q 11/00* | (2006.01) |
| *A47L 7/00* | (2006.01) |
| *A47L 9/28* | (2006.01) |
| *B25D 17/20* | (2006.01) |

(52) U.S. Cl.
CPC ........ *B23Q 11/0046* (2013.01); *A47L 7/0095* (2013.01); *A47L 9/2836* (2013.01); *A47L 9/2857* (2013.01); *A47L 9/2884* (2013.01); *B23Q 11/0071* (2013.01); *B25D 17/20* (2013.01); *B25D 2217/0065* (2013.01)

(58) Field of Classification Search
CPC .. B23Q 11/0046; B23Q 11/0071; B25D 17/20

USPC .......................................................... 173/198
See application file for complete search history.

(56) References Cited

U.S. PATENT DOCUMENTS

| | | | |
|---|---|---|---|
| 11,491,597 B2 * | 11/2022 | Wierzchon | ......... B23Q 11/0046 |
| 2013/0213683 A1 * | 8/2013 | Brewster | ................. B25F 5/026 |
| | | | 173/198 |
| 2020/0306904 A1 * | 10/2020 | Iida | .................... B23Q 11/0046 |

FOREIGN PATENT DOCUMENTS

EP 3 222 386 A1 9/2017

* cited by examiner

*Primary Examiner* — Patrick D Maines
(74) *Attorney, Agent, or Firm* — Oliff PLC

(57) ABSTRACT

A power tool and a dust collection attachment have their respective batteries as power supplies and can continue operating when one of the batteries is depleted. A dust collection system for a power tool includes a power tool including a switch, a tool-body DC motor, a tool-body controller, and a tool-body battery, and a dust collection attachment attachable to the power tool and including a suction portion, a dust collector, a fan, a dust-collector DC motor, a dust-collector controller, and a dust-collector battery. When the dust collection attachment is attached to the power tool, the tool-body controller and the dust-collector controller are electrically connected to each other. The dust-collector controller uses the tool-body battery singly to supply power to the tool-body DC motor and the dust-collector DC motor or uses the dust-collector battery singly to supply power to the tool-body DC motor and the dust-collector DC motor.

11 Claims, 3 Drawing Sheets

DUST COLLECTION SYSTEM FOR POWER TOOL

CROSS-REFERENCE TO RELATED APPLICATIONS

This application claims the benefit of priority to Japanese Patent Application No. 2023-097207, filed on Jun. 13, 2023, the entire contents of which are hereby incorporated by reference.

BACKGROUND

1. Technical Field

The disclosure relates to a dust collection system for a power tool including a power tool and a dust collection attachment attached to the power tool to collect dust produced by the power tool in use.

2. Description of the Background

When a power tool such as a hammer drill is used to machine a target material such as a concrete or stone piece, a dust collection system with a dust collection attachment attached to the power tool is used to avoid dispersion of dust produced from the target material, as described in European Patent Application Publication No. 3222386. The dust collection attachment includes a suction portion that sucks dust, a dust collector that collects sucked dust, and a dust collection motor including a fan that generates a suction force. The power tool and the dust collection attachment have their respective batteries as power supplies.

BRIEF SUMMARY

In the known dust collection system for the power tool, the power tool and the dust collection attachment are driven on power from their respective batteries. The power tool or the dust collection attachment is unusable when its battery power level decreases to a level insufficient to drive the motor. When one of the batteries is depleted during work, the corresponding one of the dust collection attachment or the power tool stops, with the other continuing operating. This may interrupt the work and also lower the use efficiency of the batteries.

One or more aspects of the disclosure are directed to a dust collection system for a power tool in which a power tool and a dust collection attachment have their respective batteries as power supplies and can continue operating when one of the batteries is depleted.

A first aspect of the disclosure provides a dust collection system for a power tool, the system including:

a power tool including
  a switch,
  a tool-body direct current motor,
  a tool-body controller configured to control the tool-body direct current motor in response to an operation on the switch, and
  a tool-body battery; and
a dust collection attachment attachable to the power tool to collect dust produced by the power tool in use, the dust collection attachment including
  a suction portion,
  a dust collector configured to capture dust sucked through the suction portion, a fan configured to generate a suction force in the suction portion,
  a dust-collector direct current motor configured to rotate the fan,
  a dust-collector controller configured to control the dust-collector direct current motor, and
  a dust-collector battery,
wherein when the dust collection attachment is attached to the power tool, the tool-body controller and the dust-collector controller are electrically connected to each other, and
the tool-body controller or the dust-collector controller uses the tool-body battery singly to supply power to the tool-body direct current motor and the dust-collector direct current motor or uses the dust-collector battery singly to supply power to the tool-body direct current motor and the dust-collector direct current motor.

In the dust collection system according to the above aspect of the disclosure, the power tool and the dust collection attachment have their respective batteries as power supplies and can continue operating when one of the batteries is depleted.

DETAILED DESCRIPTION

Embodiments of the disclosure will now be described with reference to the drawings.

Figure 1:
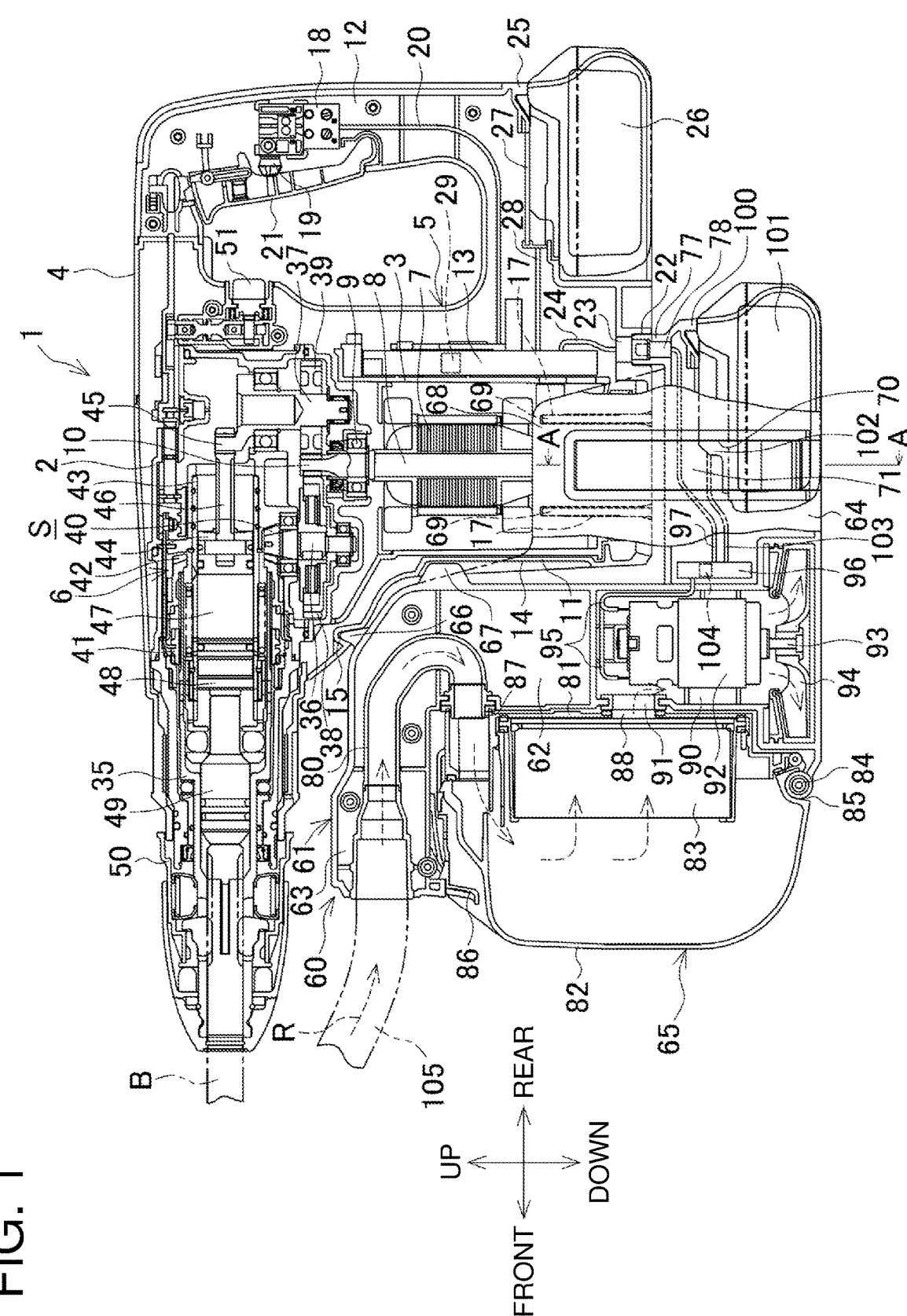
FIG. 1 is a longitudinal central sectional view of a dust collection system for a power tool.

FIG. 1 is a longitudinal central sectional view of an example dust collection system S for a power tool (hereafter referred to as a dust collection system) including a dust collection attachment 60 attached to a hammer drill 1 as an example of a power tool.

The hammer drill 1 includes a housing including an inner housing 2, a motor housing 3, an upper outer housing 4, and a lower outer housing 5. The inner housing 2 accommodates a striking assembly 6 extending in the front-rear direction. The motor housing 3 is connected to a lower portion of the inner housing 2 and accommodates a tool-body direct current (DC) motor 7. The tool-body DC motor 7 is held in the motor housing 3 with a rotational shaft 8 extending upward. The rotational shaft 8 has its upper portion supported by a bearing 9 held in the inner housing 2. The rotational shaft 8 includes, on its upper end, a pinion 10 protruding into the inner housing 2.

The upper outer housing 4 is located above the motor housing 3 and covers the outer surface of the inner housing 2.

The lower outer housing 5 includes a front cylinder 11 and a handle 12. The front cylinder 11 covers the outer surface of the motor housing 3 from below. The front cylinder 11 accommodates a tool-body controller 13 behind the motor housing 3. The tool-body controller 13 includes a control circuit board (not shown) and extends vertically. The tool-body controller 13 includes a central processing unit (CPU) on the control circuit board and a memory connected to the CPU. The tool-body controller 13 controls the operation of the hammer drill 1.

Figure 2:
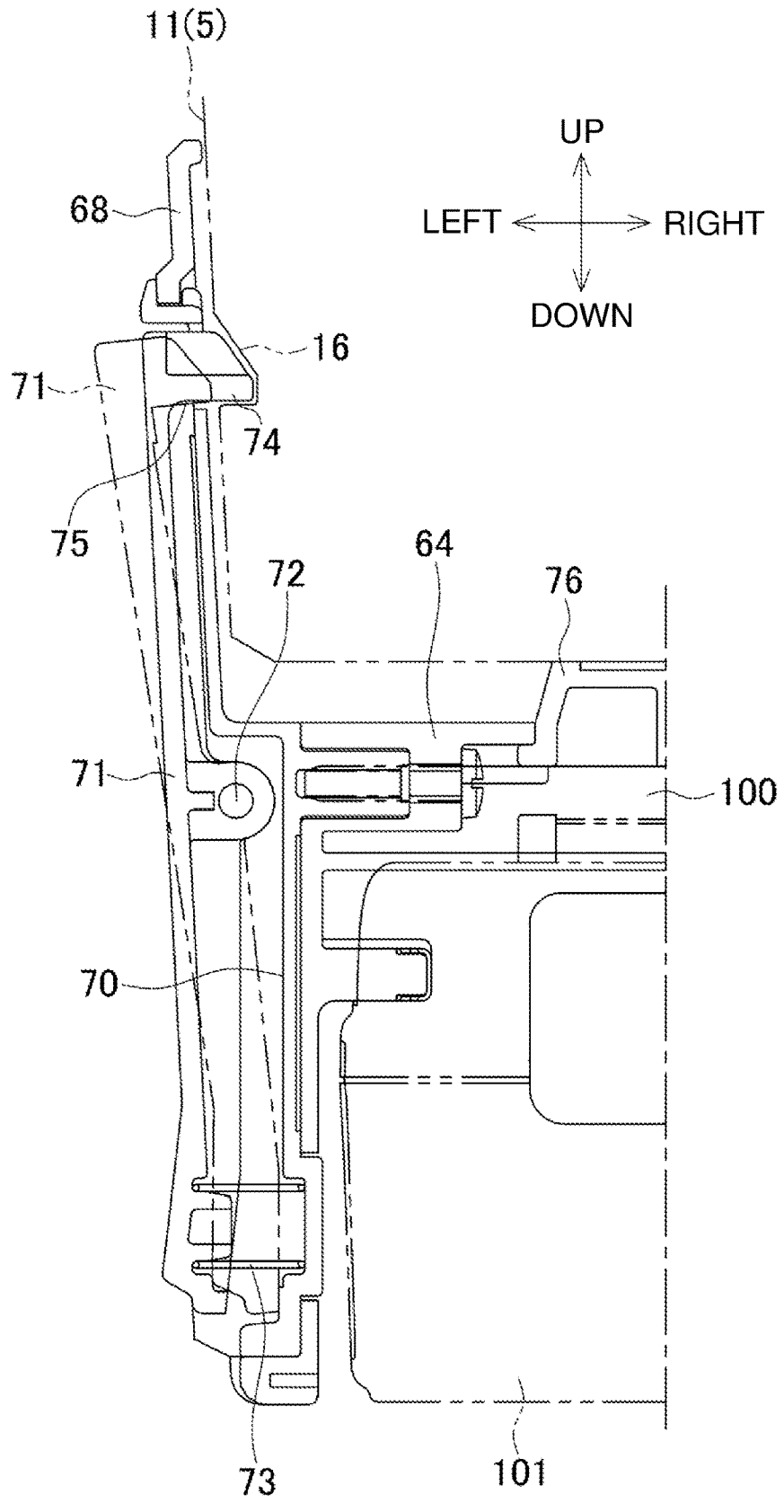
FIG. 2 is an enlarged view of a portion on the left of line A-A in FIG. 1.

The front cylinder 11 has a front guide groove 14 at the lateral center of its front surface. The front guide groove 14 extends vertically. An upper engagement recess 15 is located upward and frontward from the front guide groove 14 to receive the dust collection attachment 60. As shown in FIG. 2, the front cylinder 11 has lateral engagement recesses 16 on its right and left surfaces to receive the dust collection attachment 60. A pair of lateral guide grooves 17 are located on the front and rear of each lateral engagement recess 16. The lateral guide grooves 17 extend upward from the lower end of the front cylinder 11.

The handle 12 extends rearward from a lower portion of the front cylinder 11 and then upward to connect to the rear end of the upper outer housing 4.

The handle 12 includes a switch 18. The switch 18 pushes a plunger 19 forward. The switch 18 is connected to a tool-body first lead wire 20. The tool-body first lead wire 20 is electrically connected to the tool-body controller 13. The tool-body first lead wire 20 is used to input an on-signal into the tool-body controller 13 when the plunger 19 is pushed.

The handle 12 includes a switch lever 21 located frontward from the switch 18. The switch lever 21 is pivotable in the front-rear direction about its lower end. In a normal state, the switch lever 21 is in contact with the plunger 19 in the switch 18 and protrudes frontward from the handle 12. When the protruding switch lever 21 is pushed backward, the switch lever 21 pushes the plunger 19 to turn on the switch 18.

The lower surface of the front cylinder 11 has a connection port 22 below the tool-body controller 13. The connection port 22 is open downward. The connection port 22 includes a female connector 23 extending downward. The female connector 23 is connected to a tool-body second lead wire 24. The tool-body second lead wire 24 is electrically connected to the tool-body controller 13.

The handle 12 includes a tool-body battery mount (tool-body battery) 25 in its lower portion. A tool-body battery pack 26 is slid on and attached to the tool-body battery mount 25 from the rear to supply power.

The tool-body battery mount 25 includes a terminal block 27. The terminal block 27 is electrically connected to the attached tool-body battery pack 26. The terminal block 27 is connected to a tool-body third lead wire 28. The tool-body third lead wire 28 is electrically connected to the tool-body controller 13. The tool-body controller 13 receives power from the tool-body battery pack 26 through the tool-body third lead wire 28 and obtains information about the voltage from the tool-body battery pack 26. The tool-body controller 13 includes a tool-body indicator lamp (indicator) 29. The tool-body indicator lamp 29 is exposed on the side surface of the front cylinder 11. The tool-body indicator lamp 29 is, for example, a light-emitting diode (LED). When the voltage value obtained from the tool-body battery pack 26 decreases to less than or equal to a predetermined value prestored in the memory, the tool-body controller 13 turns on or flashes the tool-body indicator lamp 29 to indicate the voltage decrease.

The striking assembly 6 includes a tool holder 35. The tool holder 35 is rotatably held in a front portion of the inner housing 2. The tool holder 35 is cylindrical and extends in the front-rear direction. A countershaft 36 is supported in front of the rotational shaft 8 in the inner housing 2. A crankshaft 37 is supported behind the rotational shaft 8 in the inner housing 2. The countershaft 36 and the crankshaft 37 extend vertically. The countershaft 36 receives a gear 38. The crankshaft 37 receives a gear 39. The gear 38 and the gear 39 mesh with the pinion 10 on the rotational shaft 8. The countershaft 36 receives a first bevel gear 40 on its upper end.

The tool holder 35 is connected to a switching sleeve 41 with splines. Behind the switching sleeve 41, a second bevel gear 42 is externally attached to the rear end of the tool holder 35 in a rotatable manner. The second bevel gear 42 meshes with the first bevel gear 40 on the countershaft 36. With the switching sleeve 41 engaged at a backward position, the second bevel gear 42 transmits rotation of the first bevel gear 40 to the tool holder 35. The switching sleeve 41 is switched between a forward position and the backward position with a switching knob 51. The switching knob 51 is located on the rear surface of the upper outer housing 4.

The inner housing 2 holds a cylinder 43 in its rear portion. The cylinder 43 is coaxially placed in a rear portion of the tool holder 35. The cylinder 43 accommodates a piston 44 movable back and forth. The crankshaft 37 includes an eccentric pin 45 protruding from its upper portion. The piston 44 and the eccentric pin 45 are connected with a connecting rod 46. The cylinder 43 accommodates a striker 48 movable back and forth in front of the piston 44, with an air chamber 47 located between the piston 44 and the striker 48. The tool holder 35 includes an impact bolt 49 in front of the striker 48. The impact bolt 49 comes in contact with a bit B placed in the front end of the tool holder 35. The tool holder 35 includes an operation sleeve 50 externally attached to its front portion. The operation sleeve 50 is operable to attach and detach the bit B.

The switch lever 21 is pushed to turn on the switch 18. The switch 18 provides an on-signal through the tool-body first lead wire 20 to the tool-body controller 13. The tool-body controller 13 receives power from the tool-body battery pack 26 and supplies power to the tool-body DC motor 7 to rotate the rotational shaft 8. The crankshaft 37 then rotates to move the piston 44 back and forth with the connecting rod 46. This causes the striker 48 to strike the bit B with the impact bolt 49. When the switching sleeve 41 is switched to the backward position with the switching knob 51, the mode is switched to a hammer drill mode. In the hammer drill mode, the rotation of the countershaft 36 is transmitted to the tool holder 35 through the second bevel gear 42. When the switching sleeve 41 is switched to the forward position, the mode is switched to a hammer mode. In the hammer mode, striking is simply performed without the tool holder 35 rotating.

The dust collection attachment 60 will now be described.

The dust collection attachment 60 includes a box-like casing 61. The casing 61 includes a main section 62, a front protruding section 63, and a rear protruding section 64. The main section 62 extends vertically. The front protruding section 63 extends frontward from an upper portion of the main section 62. A dust box 65 is detachably attachable to the front of the main section 62 and the bottom of the front protruding section 63. The rear protruding section 64 extends rearward from a lower portion of the main section 62. The main section 62 and the rear protruding section 64 can be fastened to the hammer drill 1.

The main section 62 includes an upper engagement protrusion 66 protruding upward on its upper surface at the lateral center. The upper engagement protrusion 66 is placeable into the upper engagement recess 15 on the front cylinder 11 in the hammer drill 1.

The main section 62 includes an engagement plate 67 on an upper portion of its rear surface. The engagement plate 67 extends vertically. The engagement plate 67 is engageable with the front guide groove 14 on the front surface of the front cylinder 11.

A pair of right and left side plates 68 extend from the rear surface of the main section 62 to the upper surface of the rear protruding section 64. The space between the pair of side plates 68 receives the front cylinder 11 in the hammer drill 1 from above. Each side plate 68 has a pair of front and rear ridges 69 on its inner surface. The ridges 69 are fitted in the lateral guide grooves 17 on the side surfaces of the front cylinder 11.

Each side plate 68 has a recess 70 extending vertically on its outer surface. The recess 70 receives a hook plate 71. The hook plate 71 is a strip plate fitted in the recess 70 and extending vertically. As shown in FIG. 2, the hook plate 71 has the inner surface connected to a shaft 72 in its intermediate portion. The shaft 72 extends in the front-rear direction in the recess 70. The hook plate 71 is pivotable about the shaft 72. A lower portion of the hook plate 71 is pressed laterally outward by a coil spring 73 between the hook plate 71 and the inner surface of the recess 70. Thus, the hook plate 71 is urged to a locking position at which its upper portion is inclined laterally inward, as indicated by the solid lines in FIG. 2. The hook plate 71 includes, on its upper end, an engagement tab 74 protruding inward. At the locking position, the engagement tab 74 protrudes inward from the side plate 68 through a through-hole 75 in the recess 70. With the dust collection attachment 60 attached to the hammer drill 1, the engagement tab 74 is engaged with the lateral engagement recess 16 on the front cylinder 11. When the lower portion of the hook plate 71 is pressed toward the recess 70, the hook plate 71 inclines to an unlocking position, as indicated by the two-dot-dash lines in FIG. 2. At the unlocking position, the engagement tab 74 inclines laterally outward from the side plate 68.

The rear protruding section 64 includes a receiver 76 on its upper surface. With the dust collection attachment 60 attached, the receiver 76 is in contact with the lower surface of the front cylinder 11. The rear protruding section 64 includes a connection cylinder 77 protruding upward on its upper surface behind the receiver 76. The connection cylinder 77 is located on the rear protruding section 64 at its lateral center and holds a male connector 78 extending upward. With the dust collection attachment 60 attached, the connection cylinder 77 is connected to the connection port 22 on the lower surface of the front cylinder 11. The male connector 78 is thus connected to the female connector 23 in the connection port 22.

The front protruding section 63 accommodates a duct 80. The duct 80 has the front end (suction portion) that is open frontward at the front surface of the front protruding section 63. The duct 80 extends rearward in the front protruding section 63 and turns around in the main section 62. The duct 80 has the rear end that is open at the front surface of the main section 62 below the front protruding section 63.

The dust box (dust collector) 65 is attached to the casing 61 from the front below the front protruding section 63. The dust box 65 includes a lid 81 and a box body 82 that are hinged together at their lower ends. The lid 81 holds a filter 83 on its front inner surface. The box body 82 covers the filter 83 from the front.

The main section 62 includes an engagement shaft 84 extending laterally at the lower end of its front surface. The box body 82 has a receiving recess 85 extending laterally on its lower surface. The engagement shaft 84 is engaged with the receiving recess 85, and an elastic strip 86 at the upper end of the lid 81 is engaged with the lower surface of the front protruding section 63. The dust box 65 is thus detachably attached to the casing 61. The lid 81 has an entry port 87 in its upper portion and an exit port 88 in its lower portion. The entry port 87 is connected to the lower end of the duct 80. The exit port 88 is located behind the filter 83.

The main section 62 includes a motor compartment 90 defined behind the exit port 88. With the dust box 65 attached, the exit port 88 is aligned with an opening 91 in the front surface of the motor compartment 90 and connected to the motor compartment 90.

The motor compartment 90 accommodates a dust-collector DC motor 92. The dust-collector DC motor 92 is held with a rotational shaft 93 extending downward. A dust collection fan (fan) 94 is fixed to the rotational shaft 93. The main section 62 has outlets (not shown) in its right and left surfaces radially outward from the dust collection fan 94.

The dust-collector DC motor 92 is connected to positive and negative dust-collector first lead wires 95. The dust-collector first lead wires 95 extend through a partition between the main section 62 and the rear protruding section 64 to the internal space of the rear protruding section 64. The rear protruding section 64 accommodates a dust-collector controller 96 including a control circuit board (not shown). The dust-collector controller 96 includes a CPU on the control circuit board and a memory connected to the CPU. The dust-collector controller 96 controls the operation of the dust collection attachment 60. The dust-collector first lead wires 95 are electrically connected to the dust-collector controller 96. The dust-collector controller 96 is electrically connected to the male connector 78 through a dust-collector second lead wire 97.

The rear protruding section 64 accommodates a dust-collector battery mount 100. A dust-collector battery pack (dust-collector battery) 101 is slid on and attached to the dust-collector battery mount 100 from the rear to supply power to the dust collection attachment 60. The structure in which the dust-collector battery pack 101 is attached to the dust-collector battery mount 100 is the same as the structure in which the tool-body battery pack 26 is attached to the tool-body battery mount 25.

The dust-collector battery mount 100 includes a terminal block 102. The terminal block 102 is electrically connected to the attached dust-collector battery pack 101. The terminal block 102 is electrically connected to the dust-collector controller 96 through a dust-collector third lead wire 103.

The dust-collector controller 96 includes a dust-collector indicator lamp (indicator) 104. The dust-collector indicator lamp 104 is exposed on the side surface of the rear protruding section 64. The dust-collector indicator lamp 104 is, for example, an LED. The dust-collector controller 96 monitors the voltage of the dust-collector battery pack 101 attached to the dust-collector battery mount 100. When the dust-collector battery pack 101 has a voltage value decreased to less than or equal to a predetermined value that is prestored, the dust-collector controller 96 turns on or flashes the dust-collector indicator lamp 104 to indicate the voltage decrease.

The rear protruding section 64 is placed below the front cylinder 11 in the hammer drill 1, with the ridges 69 on the side plates 68 vertically aligned with the lateral guide grooves 17 on the front cylinder 11. The dust collection attachment 60 is then vertically moved relative to the hammer drill 1. This causes the ridges 69 to fit into the lateral guide grooves 17 from below, and also causes the upper engagement protrusion 66 on the main section 62 to fit into the upper engagement recess 15 on the front cylinder 11 from below. The engagement plate 67 on the main section 62 engages with the front guide groove 14 on the front cylinder 11 from below.

The front cylinder 11 moving relatively downward comes in contact with the hook plates 71 on the side plates 68 and causes the hook plates 71 to pivot from the locking position to the unlocking position. This allows relative movement of the dust collection attachment 60. With the dust collection attachment 60 attached, the engagement tabs 74 on the hook plates 71 are at the locking position and engaged with the lateral engagement recesses 16 on the front cylinder 11. This restricts downward movement of the dust collection attachment 60 relative to the hammer drill 1. The attachment of the dust collection attachment 60 is thus complete.

Upon completion of the attachment of the dust collection attachment 60, the connection cylinder 77 on the rear protruding section 64 is connected to the connection port 22 on the front cylinder 11. The male connector 78 is thus connected to the female connector 23. The tool-body controller 13 is thus electrically connected to the dust-collector controller 96 through the tool-body second lead wire and the dust-collector second lead wire.

The bit B is attached to the hammer drill 1. The bit B is a dust suction bit having a dust suction path along its axis with a suction port at the front end. The bit can externally receive a hose fitting (not shown) on its outer circumference. A flexible hose 105 is connected between the hose fitting and the front end of the duct 80 in the dust collection attachment 60 in which a suction force is generated.

The flexible hose 105 is connected to define a dust collection path R to allow air to flow between the bit B and the dust collection attachment 60. As indicated by the dashed arrows in FIG. 1, the dust collection path R extends from the bit B to the outlets through the flexible hose 105, the duct 80, the dust box 65, and the motor compartment 90.

The dust-collector controller 96, when electrically connected to the tool-body controller 13, determines whether the voltage of each of the tool-body battery pack 26 and the dust-collector battery pack 101 is zero or at least a predetermined value. The dust-collector controller 96 selects one of the battery packs to be used based on the determination result and performs operational control for the dust collection system S. The operational control is performed based on a program prestored in a non-transitory computer-readable storage medium including the memory connected to the CPU in the dust-collector controller 96.

In the operational control for the dust collection system S, the voltage of the battery pack being at least a predetermined value refers to the battery pack voltage being a voltage value (e.g., 36 V) sufficient to drive the DC motors 7 and 92. The voltage of the battery pack being zero refers to the battery pack voltage being a voltage value (e.g., 5 V) insufficient to drive the DC motors 7 and 92 but sufficient to operate the tool-body controller 13 or the dust-collector controller 96.

Figure 3:
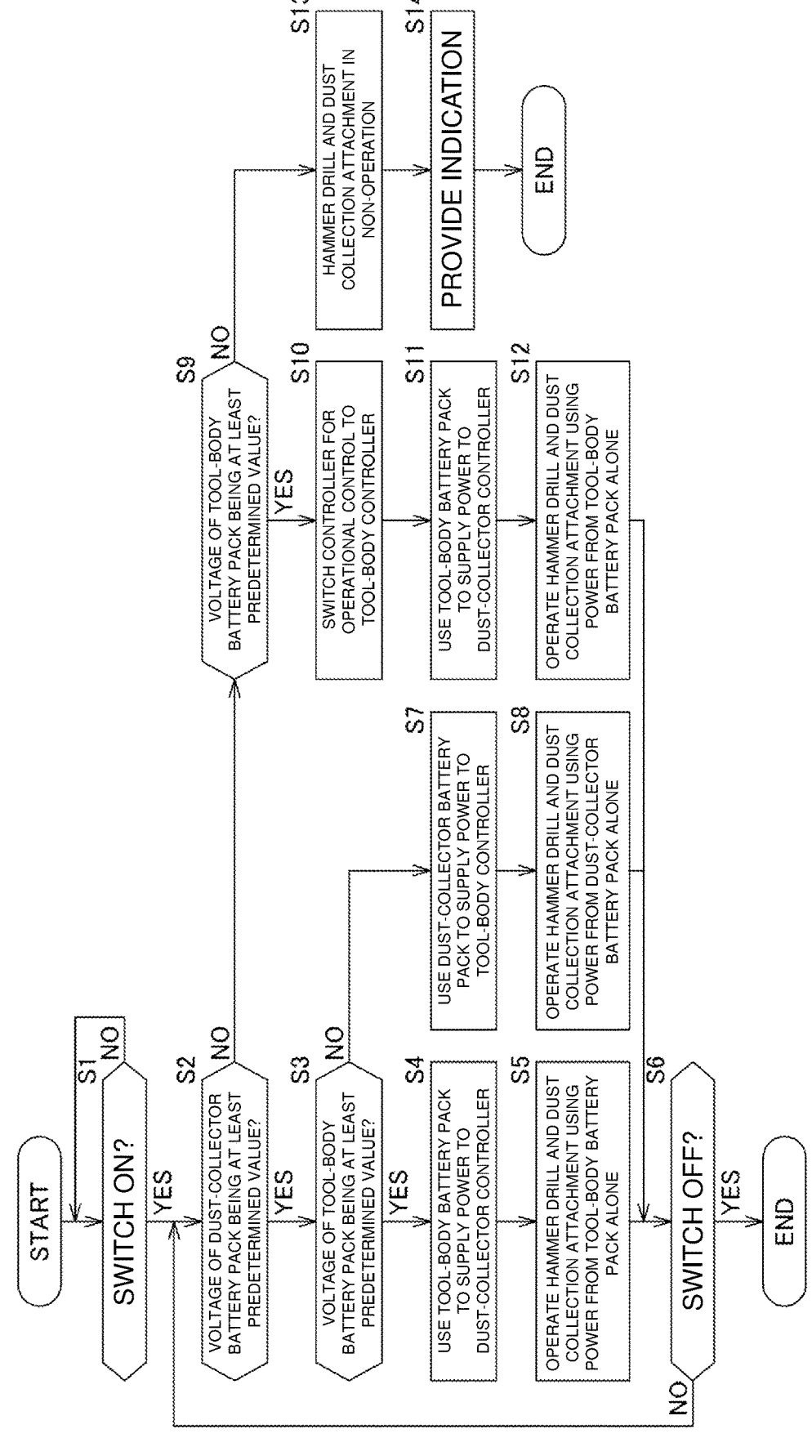
FIG. 3 is a flowchart of operational control for the dust collection system for the power tool.

The operational control for the dust collection system S will now be described with reference to the flowchart in FIG. 3.

When the switch 18 is determined to be on in step S1 in response to a push on the switch lever 21, the dust-collector controller 96 determines whether the voltage of the dust-collector battery pack 101 is zero or at least a predetermined value in step S2. When the voltage of the dust-collector battery pack 101 is at least a predetermined value, the determination is performed as to whether the voltage of the tool-body battery pack 26 is zero or at least a predetermined value in step S3. When the voltage of the tool-body battery pack 26 is at least a predetermined value, the tool-body battery pack 26 is used to supply power to the dust-collector controller 96 in the dust collection attachment 60 in step S4. In step S5, the tool-body DC motor 7 and the dust-collector DC motor 92 are driven to operate the hammer drill 1 and the dust collection attachment 60 using power from the tool-body battery pack 26 alone. The tool-body battery pack 26, which typically has higher capacity than the dust-collector battery pack 101, is used before the dust-collector battery pack 101 is used.

The operation of the hammer drill 1 and the dust collection attachment 60 will now be described in detail.

The tool-body controller 13 receives an on-signal from the switch 18, and also receives an instruction from the dust-collector controller 96 to use the tool-body battery pack 26 as a power supply. The tool-body controller 13 then supplies power from the tool-body battery pack 26 to the dust-collector controller 96 through the tool-body second lead wire 24 and the dust-collector second lead wire 97. The dust-collector controller 96 then supplies power to drive the dust-collector DC motor 92, which rotates the rotational shaft 93 and the dust collection fan 94. This causes the dust collection path R to have a negative pressure to generate a suction force at the tip opening of the bit B.

When the tool-body controller 13 receives the on-signal from the switch 18, the tool-body controller 13 waits for a preset delay time (several seconds) to elapse, and then starts supplying power from the tool-body battery pack 26 to the tool-body DC motor 7. The tool-body DC motor 7 is thus activated after the dust-collector DC motor 92 is activated. The tool-body DC motor 7 rotates the rotational shaft 8, which then rotates the countershaft 36 and the crankshaft 37. In this state, the piston 44 reciprocates independently of whether the hammer drill mode or the hammer mode is selected. This causes the striker 48 to strike the bit B with the impact bolt 49.

The dust produced from the target material is sucked into the dust suction path in the bit B and enters the duct 80 through the flexible hose 105. The dust then enters the dust box 65 through the dust collection path R, is captured by the filter 83, and is collected in the box body 82.

When the work is complete, the switch lever 21 is released and the switch 18 is turned off. When the tool-body controller 13 determines that the switch 18 has been turned off, the tool-body controller 13 stops power supply to the tool-body DC motor 7 and deactivates the hammer drill 1. The tool-body controller 13 transmits an off-signal from the switch 18 to the dust-collector controller 96. When the dust-collector controller 96 determines that the switch 18 has been turned off, the dust-collector controller 96 waits for a preset delay time (several seconds) to elapse, and then stops power supply to the dust-collector DC motor 92. This causes dust remaining in the dust collection path R to move into the dust box 65 when the hammer drill 1 is deactivated.

When determining that the switch 18 is off in step S6, the dust-collector controller 96 deactivates the dust-collector DC motor 92 after waiting for a delay time to elapse. This completes the operational control. When the switch 18 is determined to remain on in step S6, the processing returns to step S2 to determine whether the voltage of each of the battery packs 26 and 101 is zero or at least a predetermined value again.

When the tool-body battery pack 26 has a decreased power level after being singly used to supply power to the DC motors 7 and 92, the voltage of the tool-body battery pack 26 is determined to be zero in step S3. The dust-collector controller 96 then uses the dust-collector battery pack 101 to supply power to the tool-body controller 13 through the dust-collector second lead wire 97 and the tool-body second lead wire 24 in step S7. In step S8, the hammer drill 1 and the dust collection attachment 60 are operated using power from the dust-collector battery pack 101 alone.

When the voltage of the dust-collector battery pack 101 is determined to be zero in step S2, the determination is performed as to whether the voltage of the tool-body battery pack 26 is zero or at least a predetermined value in step S9. When the voltage of the tool-body battery pack 26 is determined to be at least a predetermined value, the controller for the operational control is switched to the tool-body controller 13 in step S10.

In step S11, the tool-body controller 13 uses the tool-body battery pack 26 to supply power to the dust-collector controller 96. In step S12, the hammer drill 1 and the dust collection attachment 60 are operated using power from the tool-body battery pack 26 alone.

When the tool-body battery pack 26 is also determined to have no power in step S9, neither battery pack has remaining power. Thus, an on-operation on the switch 18 cannot cause the hammer drill 1 or the dust collection attachment 60 to operate (step S13). In step S14, the tool-body controller 13 turns on or flashes the tool-body indicator lamp 29 and the dust-collector indicator lamp 104 to indicate that the battery packs 26 and 101 are depleted.

To detach the dust collection attachment 60 from the hammer drill 1, the lower portions of the right and left hook plates 71 are pressed to move the hook plates 71 to the unlocking position. This disengages the engagement tabs 74 from the lateral engagement recesses 16 on the front cylinder 11 to allow relative movement of the dust collection attachment 60. The dust collection attachment 60 is relatively moved away from the hammer drill 1 reversely from when the dust collection attachment 60 is attached. This disengages the ridges 69 on the side plates 68 from the lateral guide grooves 17 on the front cylinder 11, and also disengages the engagement plate 67 on the main section 62 downward from the front guide groove 14. At the same time, the upper engagement protrusion 66 on the main section 62 is removed from the upper engagement recess 15 on the front cylinder 11. The detachment of the dust collection attachment 60 is thus complete.

To discard dust in the dust box 65, the elastic strip 86 is pushed down to be released from the front protruding section 63. The dust box 65 is pulled forward about the engagement shaft 84 to be detached from the casing 61. The lid 81 is opened to discard dust in the box body 82.

The dust collection system S includes the hammer drill 1 including the switch 18, the tool-body DC motor 7, the tool-body controller 13 that controls the tool-body DC motor 7 in response to an operation on the switch 18, and the tool-body battery pack 26.

The dust collection system S also includes the dust collection attachment 60 attachable to the hammer drill 1 to collect dust produced by the hammer drill 1 in use. The dust collection attachment 60 includes the duct 80, the dust box 65 that captures dust sucked through the duct 80, the dust collection fan 94 that generates a suction force in the duct 80, the dust-collector DC motor 92 that rotates the dust collection fan 94, the dust-collector controller 96 that controls the dust-collector DC motor 92, and the dust-collector battery pack 101.

When the dust collection attachment 60 is attached to the hammer drill 1, the tool-body controller 13 and the dust-collector controller 96 are electrically connected to each other. The dust-collector controller 96 uses the tool-body battery pack 26 singly to supply power to the tool-body DC motor 7 and the dust-collector DC motor 92 or uses the dust-collector battery pack 101 singly to supply power to the tool-body DC motor 7 and the dust-collector DC motor 92.

In this structure, the hammer drill 1 and the dust collection attachment 60 have their respective battery packs as power supplies and can continue operating when one of the battery packs is depleted. This improves usability. Of the two battery packs 26 and 101, one is used until depleted, and subsequently the other is used until depleted. This improves the use efficiency of the battery packs 26 and 101.

The dust-collector controller 96 uses the tool-body battery pack 26 singly to supply power to the DC motors 7 and 92 before using the dust-collector battery pack 101 singly to supply power to the DC motors 7 and 92 (steps S1 to S8).

The tool-body battery pack 26, which typically has higher capacity than the dust-collector battery pack 101, can be used before the dust-collector battery pack 101 is used.

The dust-collector controller 96 monitors the voltage of each of the battery packs 26 and 101. When the battery pack 26 (101) singly used to supply power to the DC motors 7 and 92 has a voltage value being less than or equal to the predetermined value and being a voltage at which the DC motors 7 and 92 are undrivable, the other battery pack 101 (26) is singly used to supply power to the DC motors 7 and 92 (steps S1 to S12).

This allows selective use of the battery pack 26 or 101 based on the voltage value, thus effectively preventing interruption of the operation when one of the battery packs is depleted.

The dust-collector controller 96 determines the battery pack 26 (101) to be singly used to supply power to the DC motors 7 and 92. When the battery pack 26 (101) has a voltage value less than or equal to the predetermined value, the tool-body controller 13 determines the battery pack 101 (26) to be singly used to supply power to the DC motors 7 and 92 (steps S10 to S12).

This reduces the use of the tool-body battery pack 26 and also allows the uninterrupted operational control for the dust collection system S when the dust-collector battery pack 101 has a decreased voltage value.

The tool-body battery pack 26 is detachably attachable to the tool-body battery mount 25 in the hammer drill 1. The dust-collector battery pack 101 is detachably attachable to the dust-collector battery mount 100 in the dust collection attachment 60. The structure in which the tool-body battery pack 26 is attached to and detached from the tool-body battery mount 25 is the same as the structure in which the dust-collector battery pack 101 is attached to and detached from the dust-collector battery mount 100.

Thus, any of the battery packs 26 and 101 with the same rated voltage can be attached to any of the hammer drill 1 and the dust collection attachment 60, thus improving usability.

The dust-collector controller 96 activates the tool-body DC motor 7 after activating the dust-collector DC motor 92 in response to an on-operation on the switch 18.

The dust collection attachment 60 is activated to generate a suction force before the activation of the hammer drill 1. This allows reliable suction of dust simultaneously with the operation of the hammer drill 1.

The dust-collector controller 96 deactivates the dust-collector DC motor 92 after deactivating the tool-body DC motor 7 in response to an off-operation on the switch 18.

This allows dust to move into the dust box 65 without remaining in the dust collection path R after the hammer drill 1 is deactivated.

The tool-body indicator lamp 29 and the dust-collector indicator lamp 104 indicate that each of the tool-body battery pack 26 and the dust-collector battery pack 101 has a voltage less than or equal to the predetermined value.

The operator can thus promptly replace or charge the battery packs 26 and 101.

Modifications of the disclosure will now be described.

In the above operational control, the tool-body battery pack is singly used to supply power to the two DC motors before the dust-collector battery pack is singly used to supply power to the two DC motors. In some embodiments, the dust-collector battery pack may be singly used to supply power to the two DC motors before the tool-body battery pack is singly used to supply power to the two DC motors.

This can delay a decrease in the power level of the tool-body battery pack and save its power for when the hammer drill is used independently.

In the above operational control, the voltage of each battery pack is determined to be zero when the battery pack has a voltage value insufficient to drive the two DC motors. In some embodiments, when one of the two battery packs is unattached to the battery mount, the tool-body controller or the dust-collector controller may determine the voltage to be zero and use the other battery pack singly to supply power to the two DC motors.

In this case, the entire system can operate with a single battery pack attached, further improving usability.

The battery pack to be singly used to supply power may be determined based on any factor other than the voltage value of the battery pack. For example, each battery mount may include a detector such as a sensor or a switch to detect a battery pack attached. The battery pack to be singly used to supply power may be determined based on whether the detector has detected a battery pack attached.

In the hammer drill, the position and orientation of the tool-body DC motor and the position and orientation of the tool-body controller are not limited to the above embodiments. For example, the tool-body DC motor may have a rotational shaft extending frontward or diagonally frontward. The tool-body controller may extend laterally.

The position of the tool-body battery mount may be changed as appropriate. The tool-body battery pack may be slid from the front or laterally, rather than from the rear, to be attached. When two tool-body battery packs are attachable, a set of two tool-body battery packs or the dust-collector battery may be selected to be used singly.

The tool-body battery in one or more embodiments of the disclosure may be other than the detachable tool-body battery pack in the above embodiments. For example, the tool-body battery may be held in the housing of the power tool in an undetachable manner and may be rechargeable with a cable.

The structure of the striking assembly is not limited to the above embodiments. The selectable operational modes may include a drill mode.

The power tool is not limited to a hammer drill and may be another power tool such as an electric hammer.

Although the dust suction bit is attached to the power tool as a tip tool in the above embodiments, any tip tool other than the dust suction bit may be attached. In this case, a cylindrical attachment with a hose fitting may be attached to the tip of the power tool to cover the outer surface of the tip tool. The hose fitting may be connected to the suction portion in the dust collection attachment using a flexible hose.

The dust collection attachment may be attached to the power tool in, for example, the front-rear direction, rather than in the vertical direction.

In the dust collection attachment, the position and orientation of the dust-collector DC motor and the position and structure of the dust box are not limited to the above embodiments. For example, the dust-collector DC motor may be accommodated with its rotational shaft extending upward or laterally. The dust-collector DC motor and the fan may have their separate shafts, and a rotation may be transmitted from the rotational shaft of the dust-collector DC motor to the shaft of the fan.

The dust collector is not limited to a dust box and may have a cyclone structure with no filter.

The dust collection path may thus be modified as appropriate.

The dust-collector battery pack may be slid from the front or laterally, rather than from the rear, to be attached to the dust-collector battery mount.

The dust-collector battery in one or more embodiments of the disclosure may also be other than the detachable dust-collector battery pack in the above embodiments. For example, the dust-collector battery may be held in the casing of the dust collection attachment in an undetachable manner and may be rechargeable with a cable.

In the dust collection attachment, the flexible hose may be connected to, for example, the upper surface or the side surface of the casing, rather than to the front surface. The dust collection attachment may be attached without a flexible hose. For example, the dust collection attachment may include a sliding cylinder defining a dust collection path inside and protruding from the casing. The sliding cylinder may have a suction port at the tip to receive a tip tool.

The indicator is not limited to a lamp and may provide an indication using, for example, display of characters or numbers. The indicator may use a sound, such as an electronic sound, or may use both a lamp and a sound.

REFERENCE SIGNS LIST

1 hammer drill
2 inner housing
3 motor housing
4 upper outer housing
5 lower outer housing
6 striking assembly
7 tool-body DC motor
8 rotational shaft
11 front cylinder
12 handle
13 tool-body controller
18 switch
21 switch lever
23 female connector
25 tool-body battery mount
26 tool-body battery pack
29 tool-body indicator lamp
35 tool holder
44 piston
48 striker
49 impact bolt
60 dust collection attachment
61 casing
62 main section
65 dust box
71 hook plate
78 male connector 83 filter
92 dust-collector DC motor
94 dust collection fan
96 dust-collector controller
100 dust-collector battery mount
101 dust-collector battery pack
104 dust-collector indicator lamp
B bit
R dust collection path
S dust collection system for power tool

What is claimed is:

1. A dust collection system for a power tool, the system comprising:
    a power tool including
    a switch,
    a tool-body direct current motor,
    a tool-body controller configured to control the tool-body direct current motor in response to an operation on the switch, and
    a tool-body battery; and
    a dust collection attachment attachable to the power tool to collect dust produced by the power tool in use, the dust collection attachment including
    a suction portion,
    a dust collector configured to capture dust sucked through the suction portion,
    a fan configured to generate a suction force in the suction portion,
    a dust-collector direct current motor configured to rotate the fan,
    a dust-collector controller configured to control the dust-collector direct current motor, and
    a dust-collector battery,
    wherein when the dust collection attachment is attached to the power tool, the tool-body controller and the dust-collector controller are electrically connected to each other, and
    the tool-body controller or the dust-collector controller uses the tool-body battery singly to supply power to the tool-body direct current motor and the dust-collector direct current motor or uses the dust-collector battery singly to supply power to the tool-body direct current motor and the dust-collector direct current motor,
    wherein
    the tool-body controller or the dust-collector controller uses the dust-collector battery singly to supply power to the tool-body direct current motor and the dust-collector direct current motor before using the tool-body battery singly to supply power to the tool-body direct current motor and the dust-collector direct current motor.

2. The dust collection system according to claim 1, wherein
    the tool-body controller or the dust-collector controller activates the tool-body direct current motor after activating the dust-collector direct current motor in response to an on-operation on the switch.

3. The dust collection system according to claim 1, wherein
    the tool-body controller or the dust-collector controller deactivates the dust-collector controller after deactivating the tool-body direct current motor in response to an off-operation on the switch.

4. A dust collection system for a power tool, the system comprising:
    a power tool including
    a switch, a tool-body direct current motor,
    a tool-body controller configured to control the tool-body direct current motor in response to an operation on the switch, and
    a tool-body battery; and
    a dust collection attachment attachable to the power tool to collect dust produced by the power tool in use, the dust collection attachment including
    a suction portion,
    a dust collector configured to capture dust sucked through the suction portion,
    a fan configured to generate a suction force in the suction portion,
    a dust-collector direct current motor configured to rotate the fan,
    a dust-collector controller configured to control the dust-collector direct current motor, and
    a dust-collector battery,
    wherein when the dust collection attachment is attached to the power tool, the tool-body controller and the dust-collector controller are electrically connected to each other, and
    the tool-body controller or the dust-collector controller uses the tool-body battery singly to supply power to the tool-body direct current motor and the dust-collector direct current motor or uses the dust-collector battery singly to supply power to the tool-body direct current motor and the dust-collector direct current motor,
    wherein the tool-body controller or the dust-collector controller monitors a voltage of the tool-body battery and a voltage of the dust-collector battery, and when one of the tool-body battery or the dust-collector battery singly used to supply power to the tool-body direct current motor and the dust-collector direct current motor has a voltage value being less than or equal to a predetermined value and being a voltage at which the tool-body direct current motor and the dust-collector direct current motor are undrivable, the other of the tool-body battery or the dust-collector battery is singly used to supply power to the tool-body direct current motor and the dust-collector direct current motor.

5. The dust collection system according to claim 4, wherein
    the dust-collector controller determines one of the tool-body battery or the dust-collector battery to be singly used to supply power to the tool-body direct current motor and the dust-collector direct current motor, and
    when the dust-collector battery has a voltage value less than or equal to the predetermined value, the tool-body controller determines one of the tool-body battery or the dust-collector battery to be singly used to supply power to the tool-body direct current motor and the dust-collector direct current motor.

6. The dust collection system according to claim 5, wherein
    the power tool includes a tool-body battery mount to which the tool-body battery is detachably attachable,
    the dust collection attachment includes a dust-collector battery mount to which the dust-collector battery is detachably attachable, and
    a structure in which the tool-body battery is attached to and detached from the tool-body battery is the same as a structure in which the dust-collector battery is attached to and detached from the dust-collector battery mount.

7. The dust collection system according to claim 5, wherein the tool-body controller or the dust-collector controller activates the tool-body direct current motor after activating the dust-collector direct current motor in response to an on-operation on the switch.

8. The dust collection system according to claim 4, further comprising:

an indicator configured to indicate that each of the tool-body battery and the dust-collector battery has a voltage less than or equal to the predetermined value.

9. The dust collection system according to claim 4, wherein the power tool includes a tool-body battery mount to which the tool-body battery is detachably attachable, the dust collection attachment includes a dust-collector battery mount to which the dust-collector battery is detachably attachable, and a structure in which the tool-body battery is attached to and detached from the tool-body battery is the same as a structure in which the dust-collector battery is attached to and detached from the dust-collector battery mount.

10. The dust collection system according to claim 4, wherein the tool-body controller or the dust-collector controller activates the tool-body direct current motor after activating the dust-collector direct current motor in response to an on-operation on the switch.

11. A dust collection system for a power tool, the system comprising:

a power tool including a switch, a tool-body direct current motor, a tool-body controller configured to control the tool-body direct current motor in response to an operation on the switch, and a tool-body battery; and a dust collection attachment attachable to the power tool to collect dust produced by the power tool in use, the dust collection attachment including a suction portion, a dust collector configured to capture dust sucked through the suction portion, a fan configured to generate a suction force in the suction portion, a dust-collector direct current motor configured to rotate the fan, a dust-collector controller configured to control the dust-collector direct current motor, and a dust-collector battery, wherein when the dust collection attachment is attached to the power tool, the tool-body controller and the dust-collector controller are electrically connected to each other, and the tool-body controller or the dust-collector controller uses the tool-body battery singly to supply power to the tool-body direct current motor and the dust-collector direct current motor or uses the dust-collector battery singly to supply power to the tool-body direct current motor and the dust-collector direct current motor, wherein the power tool includes a tool-body battery mount to which the tool-body battery is detachably attachable, the dust collection attachment includes a dust-collector battery mount to which the dust-collector battery is detachably attachable, a structure in which the tool-body battery is attached to and detached from the tool-body battery is the same as a structure in which the dust-collector battery is attached to and detached from the dust-collector battery mount, when one of the tool-body battery or the dust-collector battery is unattached to the tool-body battery mount or the dust-collector battery mount, the tool-body controller or the dust-collector controller uses the other of the tool-body battery or the dust-collector battery singly to supply power to the tool-body direct current motor and the dust-collector direct current motor.

* * * * *